United States Patent Office 3,372,900
Patented Mar. 12, 1968

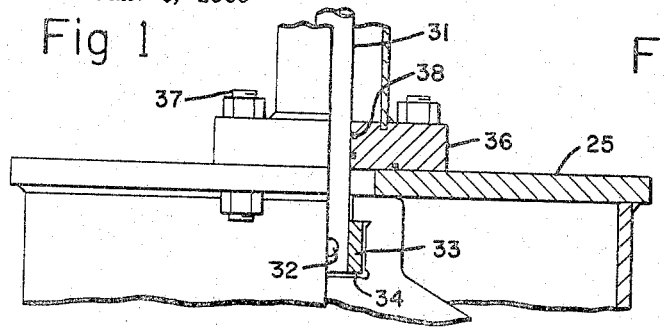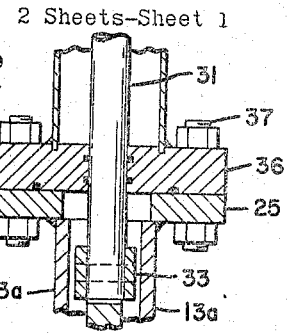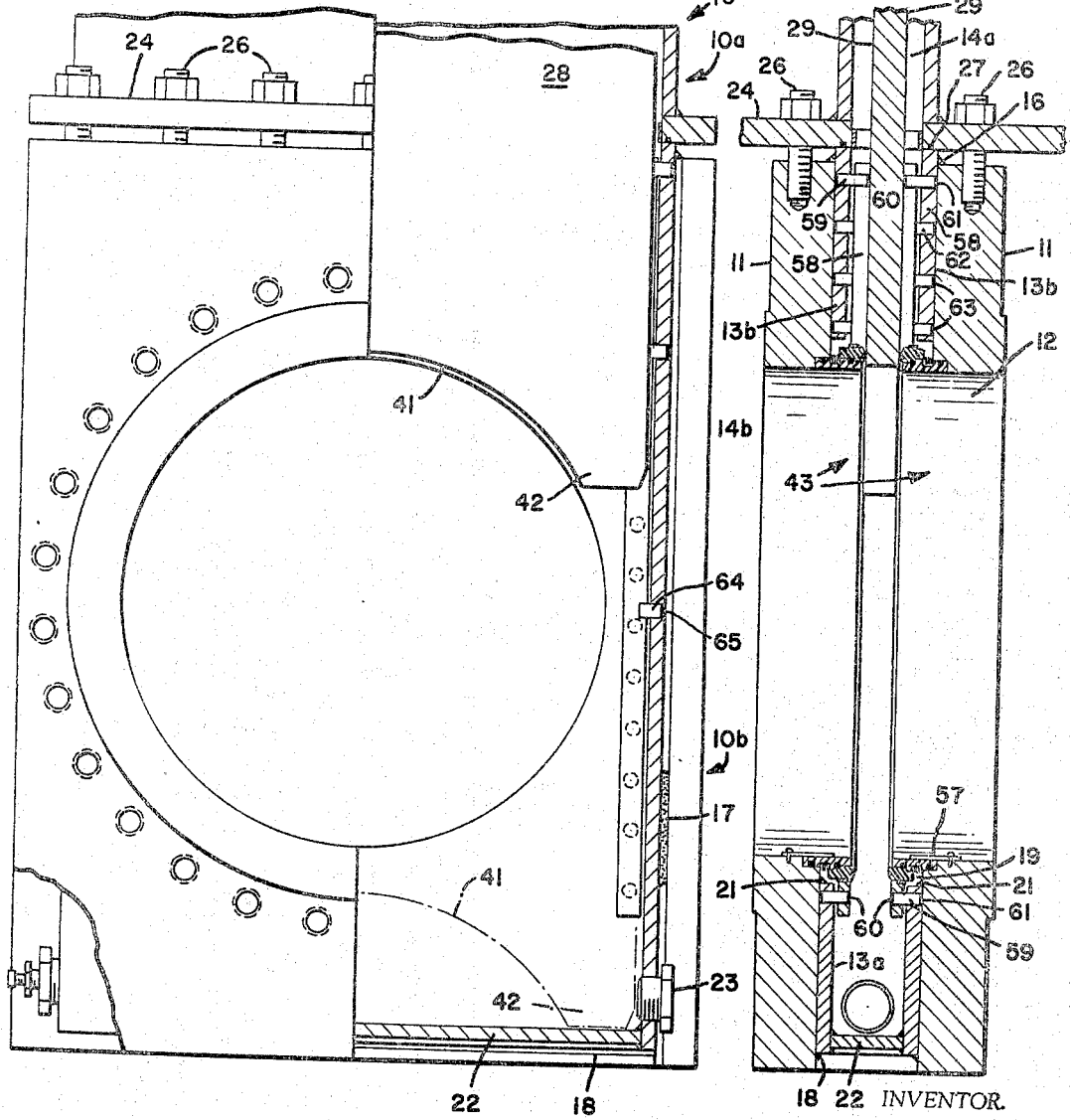

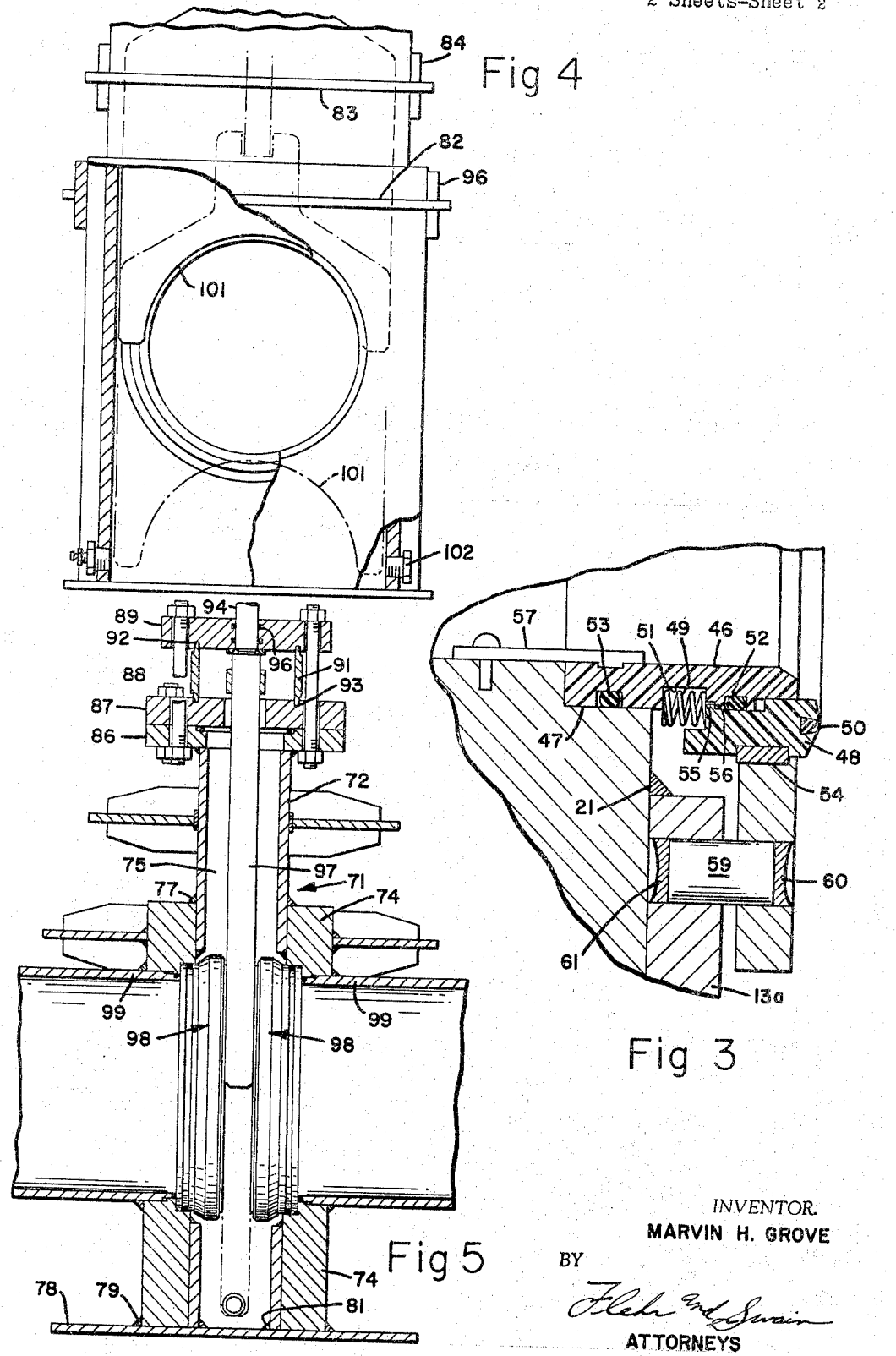

3,372,900
VALVE WITH GATE MEMBER GUIDE BARS
Marvin H. Grove, Piedmont, Calif., assignor to M & J Valve Company, Houston, Tex., a corporation of Delaware
Filed Jan. 6, 1965, Ser. No. 423,741
1 Claim. (Cl. 251—205)

This invention relates generally to valves of the gate type employed for controlling the flow of various fluids and gases.

In many services for which valves are employed, some sediment tends to collect from the liquids or gases being handled. For example, when liquid petroleum products are being handled in transmission pipe lines systems, sediment tends to collect in both piping and associated valves. For such services, it has been common to employ gate valves of the through-port type in which the gate has a circular port which registers with the flow passages in the body for full open position of the gate. Such valves permit the use of cleanout devices which are passed through the pipes and associated valves for dislodging sediment. Through-port gate valves are relatively expensive to manufacture due to the length of the gate and the size of the body required.

The simpler conventional types of gate valves do not give satisfactory services under conditions where sediment is involved. Sediment when present tends to interfere with free movement of the gate. Also, the seals employed are subject to rapid deterioration due to scratching or scoring of the seals and valve working surfaces.

In general, it is an object of the present invention to provide a gate valve which is well adapted for services where the problem of sediment is involved.

Another object of the invention is to provide a gate valve which will continue to maintain good seals on both sides of the gate irrespective of the presence of sediment. In this connection, the invention employs seal rings made of a non-metallic plastic material like nylon, and which are spring-pressed against the gate.

Another object of the invention is to provide a gate valve which is relatively inexpensive, but which can be employed in many instances in place of through-port valves.

Another object is to provide a valve construction which supports the gate for closed position of the valve in such a manner that deflection of the gate toward the downstream side does not transmit thrust against valve seating means. On the contrary, the gate is supported in such a manner, and the seals are so constructed, that thrust applied to the gate by differential applied pressure is transmitted to side margins of the body on the downstream side.

Additional objects and features of the invention will appear from the following description in which the preferred embodiments have been set forth in detail in conjunction with the accompanying drawing.

Referring to the drawing:

FIGURE 1 is a side elevational view in half section, illustrating a gate valve in accordance with the present invention;

FIGURE 2 is a cross-sectional view of FIGURE 1;

FIGURE 3 is an enlarged detail in section illustrating the sealing means incorporated in the valve of FIGURES 1 and 2;

FIGURE 4 is a side elevational view, partly in section, illustrating another embodiment of the invention; and FIGURE 5 is a cross-sectional view of FIGURE 4.

The valve body 10 preferably is made by fabrication methods, or in other words, by welding together structural steel shapes such as plates, angles, channels and the like. Although in many instances it is satisfactory to use a body made in one part, in this instance the body is made in two sections, 10a and 10b. Section 10a is at the upper or bonnet end of the body, while section 10b forms the main part of the body and a lower extension. The main body section 10b in this instance consists of relatively heavy steel plates 11 that are provided with circular openings 12 forming flow passages, and which may be termed hub plates. The body also includes a boxlike part formed by the flat end walls 13b which are attached at their sides edges to the flat side walls 14b. The walls 13a and 14b can be formed of structural steel plates welded together at their corners, or they can be formed of other structural shapes, such as channels and angles, together with plates fabricated to provide a body which is rectangular in section. Hub plates 11 are secured by welding to the exterior faces of walls 13b.

As shown in FIGURE 1, the hub plates 11 preferably are somewhat wider than the body plates 13b, and likewise the length of the hub plates 11 is such that they extend somewhat below the lower edges of the walls 13b. Weld connections 16 are shown between the upper edges of the plates 11 and the body walls 13b and likewise weld connections 17 are shown extending down from the extremities of welds 16 whereby the side margins of the plates 11 are effectively secured to the corner junction between walls 13b and 14b. The lower margins of the plates 11 are similarly secured to the lower edges of the walls 13 by the weld connections 18.

The end body walls 13b are provided with openings 19 in alignment with and somewhat greater in diameter than the openings 12. Welds 21 are shown formed about the peripheries of openings 19. Closure plate 22 is shown welded in the lower end of the body. Also this end of the body is shown provided with a removable plug 23 through which sediment can be drained.

The upper section 10a of the body preferably is likewise formed by fabrication, and is shown made from the flat ends walls 13a together with the flat side walls 14a. This part of the body is likewise box-like or rectangular in section, with substantially the same dimensions as the body part formed by the walls 13b and 14b. The lower end of the body section 10a is secured by welding to the flange plate 24, and the upper end is secured as by welding to the top closure plate 25. The upper body section 10a is seated upon the upper end of the main body section 10b, and the two body sections are securely clamped together as by means of the cap screws or studs 26. Leakage between the two sections can be prevented by suitable sealing means such as the sealing means 27 of the resilient O-ring type. Screws or studs 26 engage in threaded holes formed in the upper edges of the hub plates 11.

The gate 28 within the valve body is made from structural steel plate of suitable thickness to provide the required strength. The side surfaces 29 of this gate are finished to provide suitable valve working surfaces. The upper end of the gate is attached by suitable means to the operating rod 31. For example, the lower end of this rod is shown attached by pin 32 to a collar or nut 33 which in turn is loosely accommodated within the keyhole-shaped opening 34 in the gate. The operating rod 31 extends through an opening in the bonnet plate 36, and this plate is clamped as by cap screws or studs 37 to the body plate 24. Suitable means, such as the sealing means 38 of the resilient O-ring type, prevent leakage about the operating rod.

It will be noted that the gate 28 is relatively short compared to gates of the through-port type. The lower end portion of this gate is cut away along the arcuate line 41, which conforms to the arc of a circle having the axis of the flow passages 12 as its center. The radius to which the arc 41 is formed is substantially equal to the radius of the flow passages. Thus, for the full open position of the valve illustrated in solid lines in FIGURE 1, the arc 41 is substantially coincident with the outer periphery of the flow passages.

For the proportions illustrated in FIGURE 1, the arc 41 extends through an included angle of about 100°. In other instances, the arc may extend through a greater angle up to a maximum of about 180°. The symmetrical location and the dimensions of the arc 41 provide the depending gate portions 42 which are accommodated in the lower portion of the valve body when the gate is in full closed position. FIGURE 1 illustrates the position of the portions 42 and also of the arc 41 when the gate is in full closed position.

Suitable sealing assemblies 43 are provided on opposite sides of the gate to provide fluid tight seals between the gate and the body on both the upstream and downstream sides. Preferably, these sealing assemblies are such that they provide seal rings that are yieldably urged against the gate by suitable spring means. In addition, in accordance with the present invention these seal rings are made of relatively hard resilient non-metallic material, like molded nylon, whereby for open position of the valve, or under conditions when no pressure differential is being applied, the gate does not touch any metal parts that may be associated with the sealing assemblies. As shown in FIGURE 3, the sealing assemblies are annular, and they surround the respective flow passages on opposite sides of the gate.

The particular sealing assembly illustrated in detail in FIGURE 3 is of the type disclosed and claimed in my copending application S.N. 415,046, filed Dec. 1, 1964, and now Patent No. 3,339,886 and entitled "Valve Construction." Briefly, each assembly consists of a metal mounting ring 46 which is fitted within an annular recess 47 machined within the corresponding plate 11. The mounting rings 46 are so dimensioned that when the gate is in closed position a small amount of clearance is provided whereby under certain operating conditions, as will be presently described, the gate remains in a centrally located position out of direct contact with the adjacent ends of the metal mounting rings 46. Seal rings 48 of resilient non-metallic material, such as molded nylon, are slidably fitted upon the exterior peripheries of the mounting rings 46. The end portions of the seal rings 48 which engage the gate are provided with inserts 50 of relatively softer resilient material, such as a suitable synthetic rubber or elastomer of the polyurethane type. A nylon seal with such an insert is disclosed and claimed in my copending application Ser. No. 253,416, filed Jan. 23, 1963 and now abandoned. A plurality of compression springs 49 are disposed within a recess 51 formed in the outer periphery of the mounting ring 46, and these springs are disposed to apply thrust to the adjacent end of the seal ring 48. A seal is established between the seal ring 48 and the mounting ring 46 by the seal 52 of the resilient O-ring type. A similar seal is shown between the mounting ring 46 and the body. In accordance with the disclosure in said first mentioned copending application Ser. No. 415,046, filed Dec. 1, 1964, the seal ring 48 can be provided with an exterior metal carrier ring or band 54, which is shrunk in place to effect some precompression of the nylon seal ring. This is advantageous in that it serves to maintain fixed dimensions for the nylon ring independently of temperature changes or liquid absorption. Snap-in retention can be provided as disclosed and claimed in my copending application Ser. No. 190,174, filed Apr. 24, 1962 and now Patent No. 3,166,291. Thus, the ring 48 can be provided with a rib 55 which is distorted when the seal ring is forced upon the mounting ring but which normally retains the seal ring by engaging shoulder 56. If desired, one or more releasable spring clips 57 can be provided for releasably retaining the mounting rings 46 within the body.

The dimensioning of the parts of the sealing assemblies is such that when the gate is in closed position, the springs apply considerable force to the nylon seal rings 47, thus urging these rings against the gate. Since the force applied by the springs is substantially equal on each side of the gate, the gate takes a position intermediate the adjacent ends of the mounting rings 46. Thus, unless differential pressure is applied to the gate to force it against the mounting ring upon the downstream side, the gate is only in contact with the nylon seal rings 47 and the inserts 48, and is completely out of contact with any metal parts.

In some instances it is desirable to provide means for guiding the gate and for restraining the gate whereby even under line pressure conditions it is not forced against the mounting ring 46 upon the downstream side. The guide means illustrated in FIGURES 1 and 2 consists of metal strips or bars 58 which extend along the side margins of the end walls 13b on opposite sides of the gate. Various means can be employed for mounting these guide bars. The particular mounting means illustrated includes the upper and lower studs 59 which extend through openings in the bars and in the side walls 13a, and which are fixed during assembly by means of weld metal 60 and 61. The guide bars 58 are also supported intermediate their ends by the studs 62 which likewise extend through openings in the ends 13b and which are fixed by means of weld metal 63. In general, it may be explained that when the guide bars 58 are employed they are mounted and located during assembly of the main section of the valve body and before the hub plates 11 have been applied. As previously indicated, the tolerances between the guide bars 58 and the adjacent surfaces of the gate are such that the gate has limited freedom of movement in a lateral direction but such freedom is insufficient to permit the gate to be brought into direct metal-to-metal contact with the metal mouning rings 46.

Aside from the guide strips 58, it is desirable to provide suitable means which maintains the gate relatively centrally of the body, as viewed in FIGURE 1. For this purpose I have shown a series of studs 64 which extend through openings in the side walls 14b and which are fixed by application of weld metal 65.

A particular feature of the guide bars 58 is that they are disposed along the side margins of the end walls 13b, whereby they are engaged by the side margins of the gate 28. Thus, when the gate is urged in one direction by differential fluid pressure, the thrust is taken on the bars 58, and no part of this thrust is taken by other parts of the body, such as the mounting rings 46. With the gate being supported and guided in this manner, it is evident that it must have sufficient strength to withstand the pressures for which the valve is designed without undue deflection of the gate. However, other parts of the valve body, including the hub plates 11 and side walls of the body sections can be lighter because they need not be of sufficient strength to withstand the gate thrust.

In general, the valve described above is used in the same manner as ordinary gate valves. Piping can be connected with the flow passages either by welding piping or hubs to the hub plates 11, or by bolting or coupling flanges. When the gate is in full open position, the arcuate edge 41 is coincident with the periphery of the flow passages, and the seal rings 47 engage the margin of the gate adjacent the arc 41. Under such conditions, a substantial amount of sediment may collect in the lower part of the body. When the gate is moved to full closed positions, illustrated in dotted lines in FIGURE 1, any accumulated sediment in the lower part of the body is penetrated by the portions 42, and the space below the arc 41 is provided for receiving any displaced sediment. Assuming that no pressure differential is applied to the gate, then the gate remains out of contact with the metal mounting rings 46 for full open position and for movements between open and closed positions, and for full closed position. When pressure differential is applied to the gate in full closed position, it is forced toward one side, and if the guide bars 56 are not employed, then it will abut and apply thrust to the downstream mounting ring 46. If the guide strips 56 are employed and are set in the manner previously described, the gate remains out of contact with the downstream mounting ring 46 even though pressure differential is applied, because under such conditions the thrust of the gate is taken by the bars 58. Because the gate normally is maintained out of contact with the metal mounting rings in movements between full open and closed positions, it can be moved without causing scratching or scoring of the valve working surfaces and the seat rings, and thus the sealing means is not subjected to rapid deterioration during usage even though considerable abrasive sediment is involved. With respect to the portions of the nylon seal rings which are not in contact with the gate when the gate is in full open position, it will be noted that such portions are limited in the extent of their permissible movement toward each other by virtue of the retention of the compression springs 49 in the recesses 51, and also by virtue of the retention of the nylon seal rings upon the mounting rings due to engagement of the ribs 55 with the shoulders 56.

The particular fabricated valve body shown in FIGURES 1 and 2 is novel in that it is formed in two sections, one being the main part of the body, and the other forming a section for the upper end of the body. The manner in which the upper body section is made separately, and then attached by bolting to the main body section, makes for ease of dismantling and repair, and in addition, simplifies the design of the valve and facilitates its economical manufacture.

The embodiment shown in FIGURES 4 and 5 differs particularly in the construction of its body. Thus, in this instance the valve body 71 is likewise formed by fabrication, but it is in one integral part instead of in two sections as illustrated in FIGURES 1 and 2. The body is again rectangular in section, and consists of the end walls 72 joined at their corners with the side walls 73. Relatively heavy hub plates 74 are attached to the exterior faces of the end walls 72, and the side edges of these plates are shown connected by the side bars 76. Welding 77 is applied across the upper edges of the hub plates 74, and suitable welding 77 is along the side corners of the body, and between such corners and the hub plates. At the bottom of the body there is closure plate 78 which is attached to the hub plates by welding 79 and to the body end walls 72 by welding 81. The side plates 76 are attached by welding to the extremities of the reinforcing ribs 82. somewhat similar reinforcing ribs 83 extend across the upper portion of the body, and their extremities are attached to the side body plates 84. The upper end of the body has a welded-on flange plate 86 which forms a mounting for the bonnet means. The bonnet means includes the bonnet plate 87 which is attached to flange 86 by bolts 88. Also it includes a head plate 89, with the cylindrical shell 91 interposed between the head plate and the bonnet plate 87. The upper and lower ends of the shell 91 are sealed by suitable means such as the seals 92 and 93 of the resilient O-ring type. Likewise, leakage past the operating stem 94 is prevented by seals 96 of the resilient O-ring type.

The valve gate 97 is again flat and operates between the sealing assemblies 98. These assemblies can be substantially the same or of the same type as illustrated in FIGURE 3. Pipe coupling hubs 99 are shown attached to the hub plates 74 by welding. The arcuate edge 101 of the gate 97 is generally similar to FIGURES 1 and 2. However, it will be noted that this edge extends through substantially 180°. Thus, when the valve of this embodiment is in full open position, substantially one-half the circumference of each of the seal rings is engaged with the gate.

In the embodiment of FIGURES 4 and 5, no guide means is shown for retaining the gate or for receiving the thrust of the gate. However, it is to be understood that if desired guide means can be employed corresponding to the side guide studs 64 of FIGURES 1 and 2, and to the guide bars 58.

The valve of FIGURES 4 and 5 is capable of operating under sediment conditions the same as the first described embodiment. There is ample room in the lower end of the body to accommodate sediment, and from time to time such sediment can be removed through one or more closure plugs 102. In FIGURE 4 the lefthand showing of the gate in solid lines represents full open position. The dotted line showing represents full closed position. In full closed position there is ample space in the lower end of the body to accommodate sediment, particularly because of the substantial space embraced by the arc 101.

I claim:

1. In a gate valve construction, a body substantially rectangular in section and formed of flat end walls and flat side walls joined together at their corners, the end walls having aligned circular flow passages of equal diameter adapted for connection with associated piping, a flat gate disposed within the body and movable between open and closed positions relative to the flow passages and having parallel side margins, the body having upper and lower extending portions for accommodating the gate, the gate having flat parallel valve working surfaces formed thereon, annular sealing assemblies carried by the body and forming fluid tight seals between the body and the valve working surfaces of the gate in regions surrounding the flow passages and for closed position of the gate, said assemblies including seal rings and spring means for yieldably urging the seal rings against the sides of the gate, operating means connected to the upper portion of the gate and extending through the corresponding upper portion of the body, the lower end of the gate having a configuration as viewed in a direction corresponding to the axis of the passages which conforms to the arc of a circle with the extremities of the arc being located at the lower edge of the gate in regions spaced equal distances from the side edges of the gate, the arc being on a radius corresponding generally to the radius of said flow passages and extending through an angle of from 100 to 180°, the arc being substantially coincident with the periphery of the passages and the inner peripheries of the seal rings for full open position of the valve and being within the bottom portion of the body and below the seal rings for full closed position of the valve, the seal rings engaging the lower margin of the gate for the entire length of said arcuate configuration for full open position of the valve, and guide bars mounted upon the inner surfaces of the end walls within the body and disposed to extend along the sides of the flow passages, said bars forming abutment guides for engaging the side margins of the gate.

References Cited
UNITED STATES PATENTS

| | | | |
|---|---|---|---|
| 3,044,741 | 7/1962 | Grove | 251—328 X |
| 3,269,694 | 8/1966 | Hardison | 251—328 X |
| 1,671,617 | 5/1928 | Spitzglass | 251—205 X |
| 2,030,458 | 2/1936 | McKellar et al. | 251—328 X |
| 2,596,817 | 5/1952 | McGovney | 251—205 X |
| 2,904,306 | 9/1959 | Bryant | 251—329 X |
| 3,013,769 | 12/1961 | Volpin | 251—327 X |
| 3,194,259 | 7/1965 | Garrod | 251—328 X |

FOREIGN PATENTS

| | | |
|---|---|---|
| 111,631 | 12/1917 | Great Britain. |
| 1,078,832 | 3/1960 | Germany. |

M. CARY NELSON, *Primary Examiner.*

ARNOLD ROSENTHAL, *Examiner.*